US012748306B2

(12) United States Patent
O'Connell et al.

(10) Patent No.: US 12,748,306 B2
(45) Date of Patent: Sep. 29, 2026

(54) HEADS UP DISPLAY GLARE TRAP REFLECTION SOLUTION

(71) Applicant: Panasonic Automotive Systems Company of America, Division of Panasonic Corporation of North America, Peachtree City, GA (US)

(72) Inventors: Patrick O'Connell, Novi, MI (US); Carl Jason Schoeneberg, Decatur, GA (US)

(73) Assignee: Panasonic Automotive Systems America, LLC., Peachtree City, GA (US)

( * ) Notice: Subject to any disclaimer, the term of this patent is extended or adjusted under 35 U.S.C. 154(b) by 286 days.

(21) Appl. No.: 18/599,755

(22) Filed: Mar. 8, 2024

(65) Prior Publication Data

US 2024/0302655 A1 Sep. 12, 2024

Related U.S. Application Data

(60) Provisional application No. 63/451,191, filed on Mar. 9, 2023.

(51) Int. Cl.
*G02B 27/01* (2006.01)

(52) U.S. Cl.
CPC .. *G02B 27/0101* (2013.01); *G02B 2027/0118* (2013.01)

(58) Field of Classification Search
CPC ................ G02B 27/01; G02B 27/0101; G02B 2027/0118
USPC .......................................................... 359/630
See application file for complete search history.

(56) References Cited

U.S. PATENT DOCUMENTS

2010/0053753 A1* 3/2010 Nestorovic ........ G02B 27/0101 359/488.01
2010/0053758 A1* 3/2010 Nestorovic ........ G02B 27/0101 359/601
2019/0219821 A1* 7/2019 Sugiyama ............ G02B 27/285
2019/0235304 A1* 8/2019 Tamada ............... G02B 5/0221
2019/0265468 A1* 8/2019 Hirata ................ G02B 27/0179
2020/0143184 A1* 5/2020 Naradikian ............ H04N 23/20
2020/0201043 A1* 6/2020 Sugiyama ................. G09F 9/00
2020/0371351 A1* 11/2020 Chang .................... B60K 35/23
2021/0370775 A1* 12/2021 Yamada ................. B60K 35/22
2023/0085544 A1* 3/2023 Schardt .............. G02B 27/0101
2023/0176375 A1* 6/2023 Wolf .................. G02B 27/0101 359/630
2023/0341680 A1* 10/2023 Wille ................. G02B 27/0081
2023/0350217 A1* 11/2023 Schardt .............. G02B 27/1013

(Continued)

*Primary Examiner* — William R Alexander
(74) *Attorney, Agent, or Firm* — Laurence S. Roach, Esq.

(57) ABSTRACT

A head up display arrangement presents a virtual image to a human driver of a motor vehicle. The arrangement includes a picture generation unit emitting a light field such that the light field follows an optical path, is reflected by a windshield of the motor vehicle, and is visible to the human driver as the virtual image. A glare trap lens is positioned in the optical path between the picture generation unit and the windshield and passes the light field. The glare trap lens improves an optical characteristic of the virtual image as seen by the human driver. The glare trap lens includes an outer surface having an elongate rib thereon. The rib is positioned to block stray light that has been reflected off of the outer surface of the glare trap lens.

18 Claims, 9 Drawing Sheets

(56) References Cited

U.S. PATENT DOCUMENTS

| | | | | |
|---|---|---|---|---|
| 2024/0167913 | A1* | 5/2024 | Wille | G02B 27/0018 |
| 2024/0219719 | A1* | 7/2024 | Bates | G02B 27/288 |
| 2024/0345393 | A1* | 10/2024 | Sugiyama | G02B 6/00 |
| 2024/0385441 | A1* | 11/2024 | Jose | G02B 27/0101 |
| 2024/0427138 | A1* | 12/2024 | Mizushima | G02B 27/0101 |
| 2025/0123487 | A1* | 4/2025 | Misawa | G02B 27/0149 |
| 2025/0189784 | A1* | 6/2025 | Jose | G02B 27/0101 |

* cited by examiner

HEADS UP DISPLAY GLARE TRAP REFLECTION SOLUTION

CROSS-REFERENCED TO RELATED APPLICATIONS

This application claims benefit of U.S. Provisional Application No. 63/451,191, filed on Mar. 9, 2023, the disclosure of which is hereby incorporated by reference in its entirety for all purposes.

BACKGROUND OF THE INVENTION

1. Field of the Invention

The present invention relates to a head up display (HUD) of a motor vehicle.

2. Description of the Related Art

A head up display emits light that reflects from the front windshield to be seen by the driver. The light appears to come from a virtual image in front of the driver and in front of the windshield. This type of head up display is currently commercially available.

Conventional head up displays create the virtual image by first using a display or picture generation unit to create an image. Next, the light from the image is reflected from one or more mirrors. Next, the light from the mirrors is directed up to the windshield and is then reflected from the windshield towards the driver. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

SUMMARY OF THE INVENTION

The invention may provide a dual plane heads up display (HUD) that creates two images. In order to create both of the two images, the picture generation unit (PGU) may need to be very bright and have a larger cone angle of light. Compared to current HUDs that produce only one image, the dual plane PGU causes more light to be reflected off various surfaces, including the inner surface of the glare trap lens, which may result in an undesirably high level of stray light. This invention may provide stray light mitigation by blocking the reflection off the inner surface of the glare trap lens. The invention may provide a piece of material along the inner surface of the glare trap lens. The invention may prevent stray light from being reflected off the inner surface of the glare trap lens when there isn't sufficient room to package the ray bundles and glare trap lens geometry with enough clearance to stop reflections from occurring.

The invention comprises, in one form thereof, a head up display arrangement presenting a virtual image to a human driver of a motor vehicle. The arrangement includes a picture generation unit emitting a light field such that the light field follows an optical path, is reflected by a windshield of the motor vehicle, and is visible to the human driver as the virtual image. A glare trap lens is positioned in the optical path between the picture generation unit and the windshield and passes the light field. The glare trap lens improves an optical characteristic of the virtual image as seen by the human driver. The glare trap lens includes an outer surface having an elongate rib thereon. The rib is positioned to block stray light that has been reflected off of the outer surface of the glare trap lens.

The invention comprises, in another form thereof, a method for presenting a virtual image to a human driver of a motor vehicle, including emitting a light field from a picture generation unit such that the light field follows an optical path, is reflected by a windshield of the motor vehicle, and is visible to the human driver as the virtual image. A glare trap lens is positioned in the optical path between the picture generation unit and the windshield. The glare trap lens includes an outer surface having an elongate rib thereon. The light field is passed through the glare trap lens to thereby improve an optical characteristic of the virtual image as seen by the human driver. The rib on the glare trap lens is used to block stray light that has been reflected off of the outer surface of the glare trap lens.

The invention comprises, in yet another form thereof, a head up display arrangement for presenting virtual images to a human driver of a motor vehicle. The arrangement includes at least one picture generation unit emitting a first light field such that the first light field follows a first optical path, is reflected by a windshield of the motor vehicle, and is visible to the human driver as a first virtual image. The picture generation unit emits a second light field such that the second light field follows a second optical path, is reflected by a windshield of the motor vehicle, and is visible to the human driver as a second virtual image. A first glare trap lens is positioned in the first optical path between the at least one picture generation unit and the windshield, and passes the first light field. The first glare trap lens improves an optical characteristic of the first virtual image as seen by the human driver. A second glare trap lens is positioned in the second optical path between the at least one picture generation unit and the windshield and passes the second light field. The second glare trap lens improves an optical characteristic of the second virtual image as seen by the human driver.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
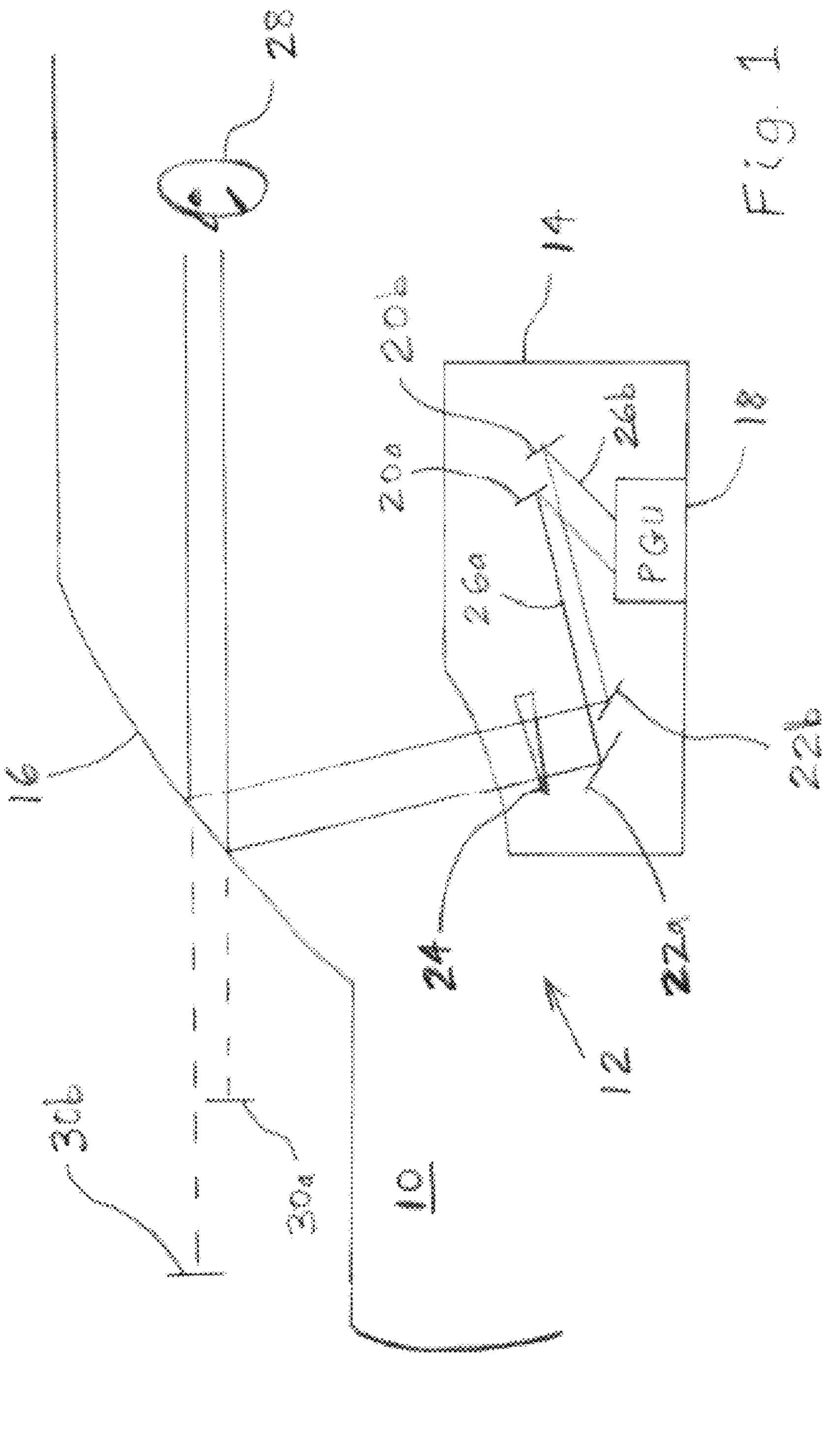
FIG. 1 is a schematic side view of one embodiment of a motor vehicle including a HUD arrangement of the present invention.

FIG. 1 illustrates one embodiment of a motor vehicle 10 including a head up display (HUD) arrangement 12 of the present invention, including a HUD unit 14 and a windshield 16. HUD unit 14 may include a picture generation unit (PGU) 18, a near image fold mirror 20*a*, a far image fold mirror 20*b*, a second near image mirror 22*a*, a second far image mirror 22*b*, and a glare trap lens 24.

During use, light fields 26*a-b* from PGU 18, after being first reflected by mirrors 20*a-b*, may be reflected by mirrors 22*a-b* and then by windshield 16 such that the reflections are visible to a driver 28 as virtual images 30*a-b*.

Figure 2:
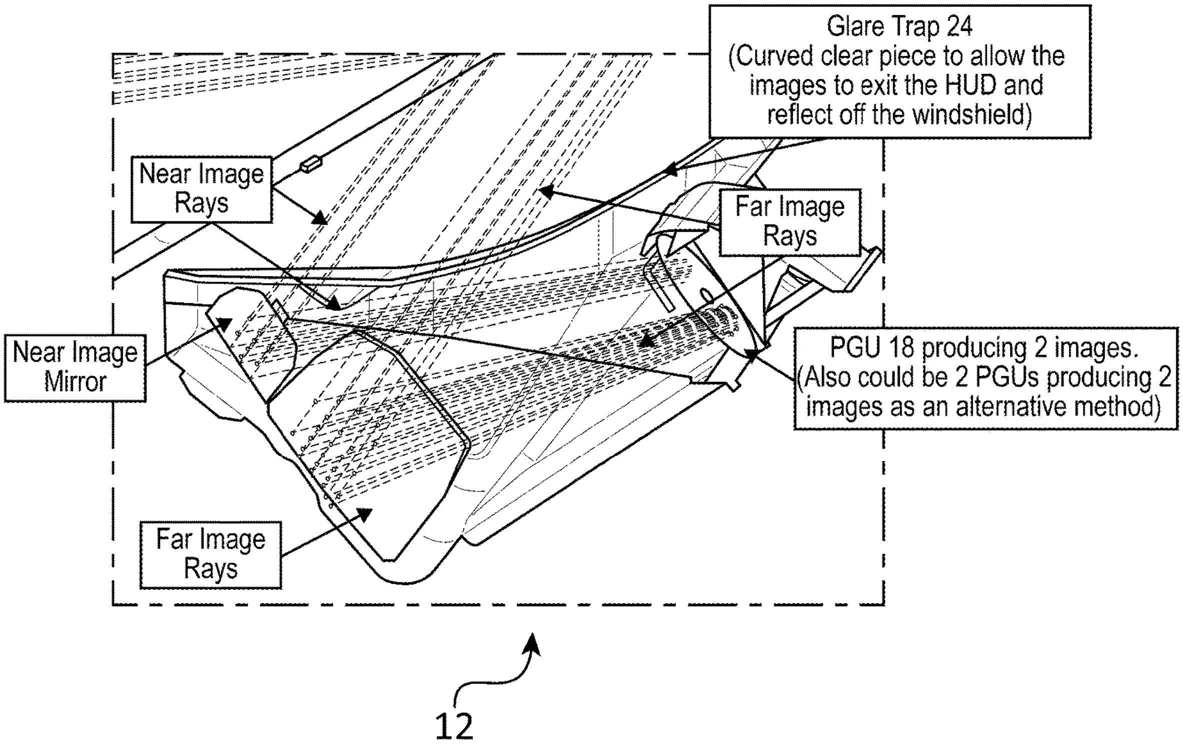
FIG. 2 is a fragmentary sectional view of one embodiment of the HUD arrangement of FIG. 1.

FIG. 2 illustrates HUD arrangement 12, including a single PGU 18 producing two different images that reflect off of two separate mirrors. The two resulting virtual images can be at the same image distance. Alternatively, the two images can be at two different distances, as shown in FIG. 1 where there is a shorter distance between driver 28 and a near virtual image 30*a* than between driver 28 and a far virtual image 30*b*. Glare trap lens 24, which may be referred to herein as simply the "glare trap", may include a curved clear piece to allow the images to exit the HUD and reflect off the windshield. Although a single PGU 18 is shown producing two images, it is also possible for there to be two PGUs each producing a separate one of two images.

Figure 3:
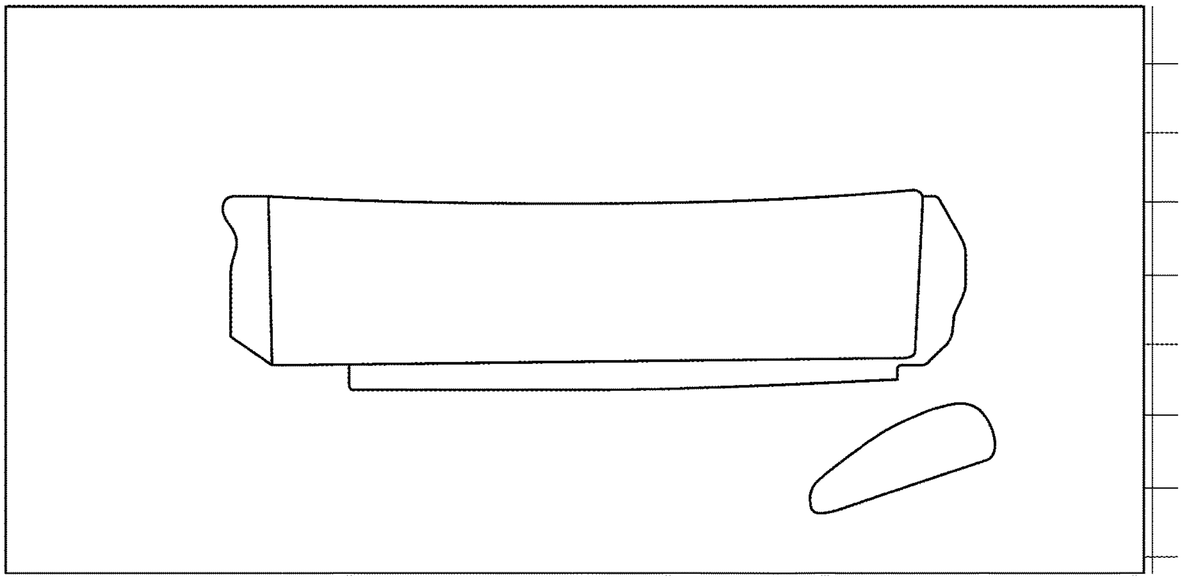
FIG. 3 is a plan view of an example virtual image produced by the HUD arrangement of FIG. 1 as seen by the driver.
Figure 4:
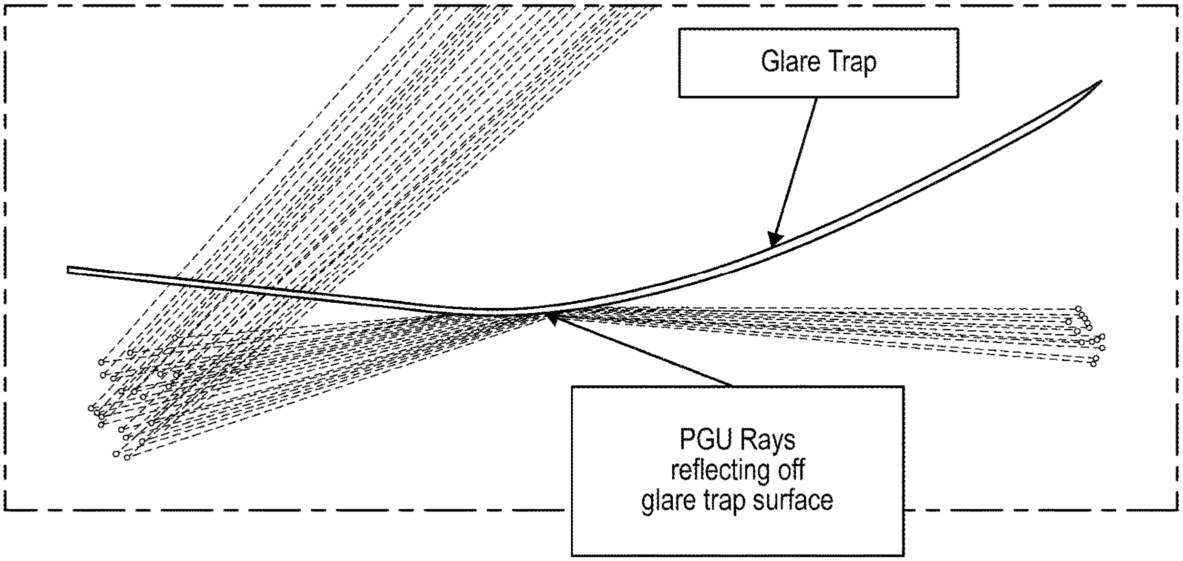
FIG. 4 is a fragmentary side view of light from the picture generation unit of the HUD arrangement of FIG. 1 reflecting off of a surface of one embodiment of the glare trap lens of the HUD arrangement of FIG. 1, which, in the absence of the inventive rib, may result in the unwanted stray light in the example virtual image of FIG. 3.

FIG. 3 is an example near virtual image produced by HUD arrangement 12 as seen by the driver. Without the benefits of the present invention, there may be significant stray light underneath the near field image, as encircled in FIG. 3. This stray light may result from a reflection of the projected light field off of the glare trap surface, as shown in FIG. 4.

Figure 5:
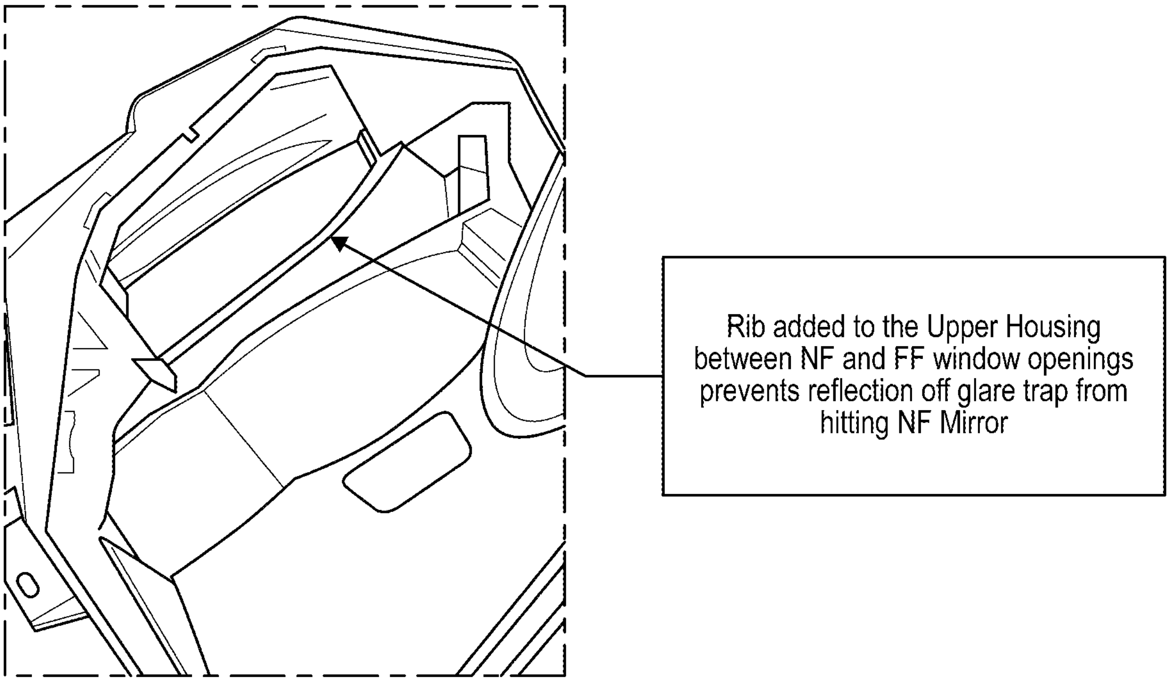
FIG. 5 is a perspective view of the glare trap lens of the HUD arrangement of FIG. 1.

FIG. 5 illustrates glare trap lens 24 including a rib on the upper housing between the near field and far field window openings to prevent reflection of light off of glare trap lens 24 from hitting near field mirror 22*a*. The rib may be on the upper housing and across the glare trap to block the reflected light from reaching the mirror and the driver's eye point.

Figure 6:
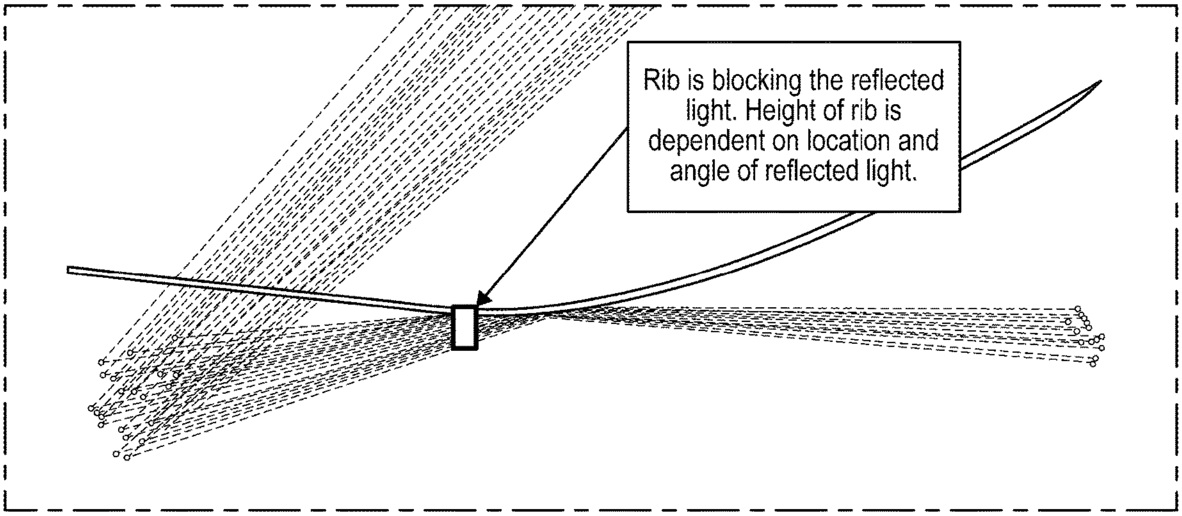
FIG. 6 is a fragmentary side view of light from the picture generation unit of the HUD arrangement of FIG. 1 reflecting off of a surface of another embodiment of the glare trap lens of the HUD arrangement of FIG. 1, including the inventive rib to prevent the unwanted stray light in the example virtual image of FIG. 3.

FIG. 6 illustrates the rib blocking the light reflecting off of a surface of the glare trap lens. Thus, the rib prevents the unwanted stray light. The height of the rib may be determined dependent on the location and angle of reflected light in the particular application. The light travels from right to left in FIG. 6 to reflect off the glare trap lens before being blocked by the rib. Although FIG. 6 shows the light going through the rib and continuing along its path as if the rib were not there, it is to be understood that, in actuality, the light is blocked by the rib and does not continue along its path.

Figure 7:
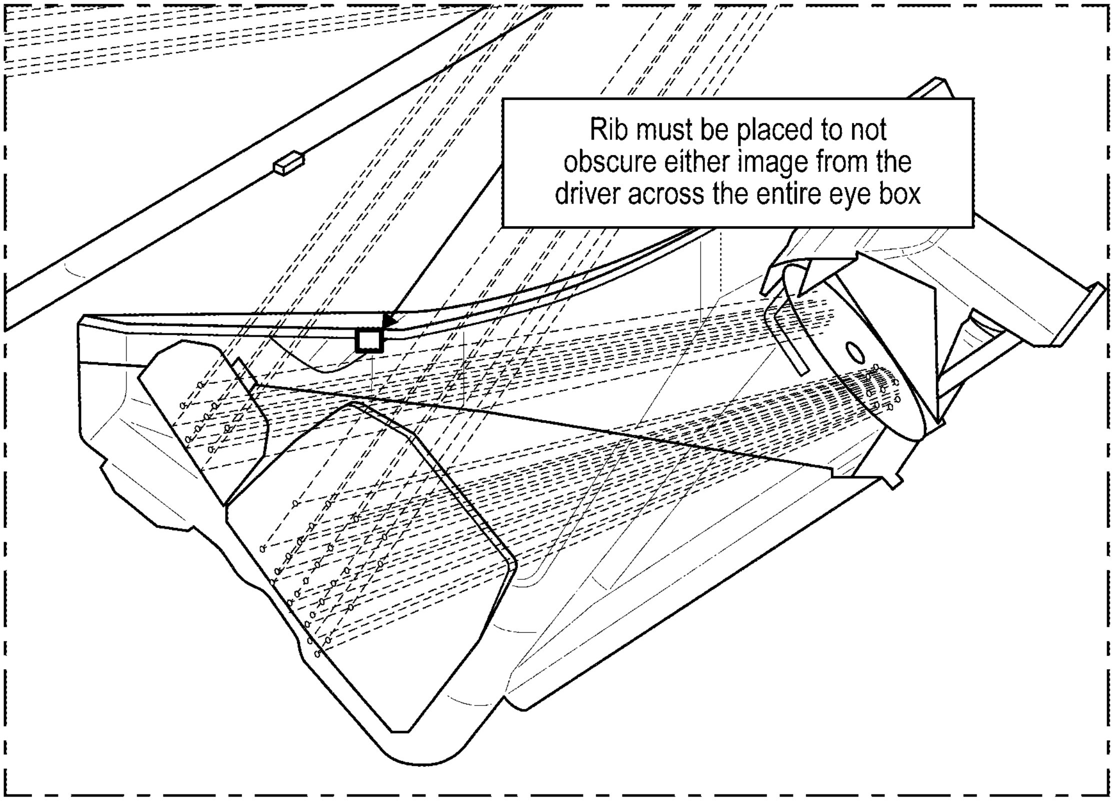
FIG. 7 is a fragmentary sectional view of another embodiment of the HUD arrangement of FIG. 1.

FIG. 7 illustrates another embodiment of the HUD arrangement of FIG. 1, including a glare trap with the inventive rib. To ensure that the rib has no impact to the two images, the rib may be located between the two light paths where they are exiting the HUD to go to the windshield. The rib may be placed so as to not obscure either image from the driver across the entire eye box.

Figure 8:
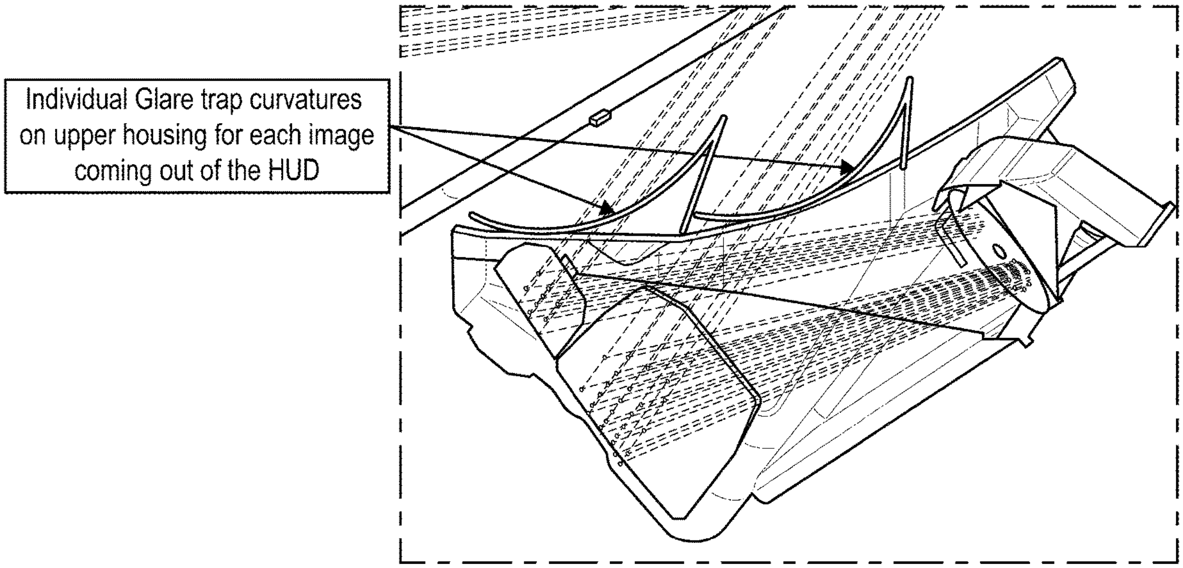
FIG. 8 is a fragmentary sectional view of yet another embodiment of the HUD arrangement of FIG. 1.

FIG. 8 illustrates yet another embodiment of the HUD arrangement of FIG. 1, including a PGU producing two different images that reflect off of two separate mirrors. The two resulting virtual images can be at the same image distance. Alternatively, the two images can be at two different distances, as shown in FIG. 1 where there is a shorter distance between driver 28 and a near virtual image 30*a* than between driver 28 and a far virtual image 30*b*. Instead of having one continuous glare trap to allow both images to exit the HUD, as in the embodiment of FIG. 2, there are two separate glare traps and glare trap curvatures. Each one of the glare traps corresponds to a respective one of the two images. This embodiment may eliminate the glare trap area between the two images in the embodiment of FIG. 2 that causes the reflection. Each of the two glare trap lenses may include a respective curved clear piece to allow the respective image to exit the HUD and reflect off the windshield. In FIG. 8 are two individual glare trap curvatures on the upper housing for each image coming out of the HUD. Although a single PGU is shown in FIG. 8 producing two images, it is also possible for there to be two PGUs each producing a separate one of two images.

Figure 9:
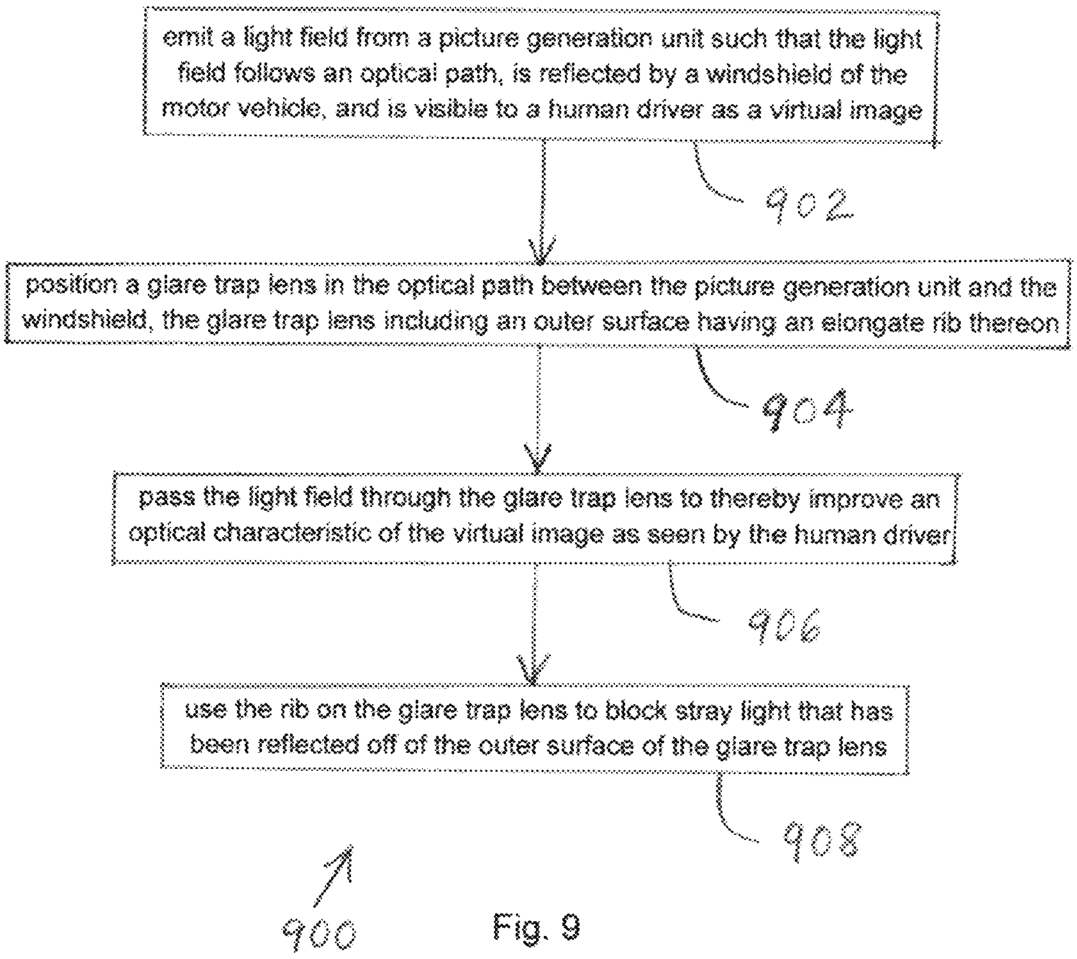
FIG. 9 is a flow chart of one embodiment of a method of the present invention for presenting a virtual image to a human driver of a motor vehicle.

FIG. 9 is a flow chart of one embodiment of a method 900 of the present invention for presenting a virtual image to a human driver of a motor vehicle. In a first step 902, a light field is emitted from a picture generation unit such that the light field follows an optical path, is reflected by a windshield of the motor vehicle, and is visible to the human driver as the virtual image. For example, light fields 26*a-b* from PGU 18 may be reflected by windshield 16 such that the reflections are visible to a driver 28 as virtual images 30*a-b*.

Next, in step 904, a glare trap lens is positioned in the optical path between the picture generation unit and the windshield, the glare trap lens including an outer surface having an elongate rib thereon. For example, glare trap lens 24 includes a rib on its upper housing. The images from PGU 18 may pass through glare trap lens 24 to exit the HUD and reflect off windshield 16.

In a next step 906, the light field passes through the glare trap lens to thereby improve an optical characteristic of the virtual image as seen by the human driver. For example, glare trap lens 24 may remove or reduce ghost images in the virtual image.

In a final 908, the rib on the glare trap lens is used to block stray light that has been reflected off of the outer surface of the glare trap lens. For example, as shown in FIG. 6, the rib on glare trap lens 24 may block stray light that has been reflected off an outer surface of glare trap lens 24. Thus, the rib may prevent the stray light from being visible in the virtual image.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A head up display arrangement for presenting a virtual image to a human driver of a motor vehicle, the arrangement comprising:

a picture generation unit configured to emit a light field such that the light field follows an optical path, is reflected by a windshield of the motor vehicle, and is visible to the human driver as the virtual image; and a glare trap lens positioned in the optical path between the picture generation unit and the windshield and configured to pass the light field, the glare trap lens being configured to improve an optical characteristic of the virtual image as seen by the human driver, the glare trap lens including an outer surface having an elongate rib thereon, the rib being positioned and configured to block stray light that has been reflected off of the outer surface of the glare trap lens.

2. The arrangement of claim 1 wherein the glare trap lens is curved and transparent.

3. The arrangement of claim 1 wherein the glare trap lens includes an upper housing, the rib being disposed on the upper housing.

4. The arrangement of claim 1 further comprising at least one mirror positioned in the optical path between the picture generation unit and the glare trap lens and configured to reflect the light field.

5. The arrangement of claim 4 wherein the light field comprises a near field light field, the optical path comprises a first optical path, and the virtual image comprises a near field virtual image, the picture generation unit being configured to emit a far field light field such that the far field light field follows a second optical path, is reflected by the windshield of the motor vehicle, and is visible to the human driver as a far field virtual image.

6. The arrangement of claim 5 wherein the at least one mirror comprises at least one near field mirror, the arrangement further comprising at least one far field mirror positioned in the second optical path between the picture generation unit and the glare trap lens and configured to reflect the far field light field, the glare trap lens including:

a near field window opening through which the first optical path extends; and a far field window opening through which the second optical path extends.

7. The arrangement of claim 6 wherein the rib is positioned between the first optical path and the second optical path, the rib being positioned and configured to block stray light that has been reflected off of the outer surface of the glare trap lens from reaching the at least one near field mirror.

8. The arrangement of claim 1 wherein the optical characteristic comprises glare from stray light reflected off the outer surface of the glare trap lens.

9. A method for presenting a virtual image to a human driver of a motor vehicle, the method comprising:

emitting a light field from a picture generation unit such that the light field follows an optical path, is reflected by a windshield of the motor vehicle, and is visible to the human driver as the virtual image;

positioning a glare trap lens in the optical path between the picture generation unit and the windshield, the glare trap lens including an outer surface having an elongate rib thereon;

passing the light field through the glare trap lens to thereby improve an optical characteristic of the virtual image as seen by the human driver; and using the rib on the glare trap lens to block stray light that has been reflected off of the outer surface of the glare trap lens.

10. The method of claim 9 wherein the glare trap lens is curved and transparent.

11. The method of claim 9 wherein the glare trap lens includes an upper housing, the rib being disposed on the upper housing.

12. The method of claim 9 further comprising:

positioning at least one mirror in the optical path between the picture generation unit and the glare trap lens; and using the at least one mirror to reflect the light field.

13. The method of claim 12 wherein the light field comprises a near field light field, the optical path comprises a first optical path, and the virtual image comprises a near field virtual image, the method further comprising emitting a far field light field from the picture generation unit such that the far field light field follows a second optical path, is reflected by the windshield of the motor vehicle, and is visible to the human driver as a far field virtual image.

14. The method of claim 13 wherein the at least one mirror comprises at least one near field mirror, the method further comprising:

positioning at least one far field mirror in the second optical path between the picture generation unit and the glare trap lens; and using the far field mirror to reflect the far field light field, the glare trap lens including:

a near field window opening through which the first optical path extends; and a far field window opening through which the second optical path extends.

15. The method of claim 14 wherein the rib is positioned between the first optical path and the second optical path, the rib blocking stray light that has been reflected off of the outer surface of the glare trap lens from reaching the at least one near field mirror.

16. The method of claim 9 wherein the optical characteristic comprises glare from stray light reflected off the outer surface of the glare trap lens.

17. A head up display arrangement for presenting virtual images to a human driver of a motor vehicle, the arrangement comprising:

at least one picture generation unit configured to:

emit a first light field such that the first light field follows a first optical path, is reflected by a windshield of the motor vehicle, and is visible to the human driver as a first virtual image; and emit a second light field such that the second light field follows a second optical path, is reflected by a windshield of the motor vehicle, and is visible to the human driver as a second virtual image;

a first glare trap lens positioned in the first optical path between the at least one picture generation unit and the windshield and configured to pass the first light field, the first glare trap lens being configured to improve an optical characteristic of the first virtual image as seen by the human driver; and a second glare trap lens positioned in the second optical path between the at least one picture generation unit and the windshield and configured to pass the second light field, the second glare trap lens being configured to improve an optical characteristic of the second virtual image as seen by the human driver, wherein each said glare trap lens is curved and transparent.

18. A head up display arrangement for presenting virtual images to a human driver of a motor vehicle, the arrangement comprising:

at least one picture generation unit configured to:

emit a first light field such that the first light field follows a first optical path, is reflected by a windshield of the motor vehicle, and is visible to the human driver as a first virtual image; and emit a second light field such that the second light field follows a second optical path, is reflected by a windshield of the motor vehicle, and is visible to the human driver as a second virtual image;

a first glare trap lens positioned in the first optical path between the at least one picture generation unit and the windshield and configured to pass the first light field, the first glare trap lens being configured to improve an optical characteristic of the first virtual image as seen by the human driver;

a second glare trap lens positioned in the second optical path between the at least one picture generation unit and the windshield and configured to pass the second light field, the second glare trap lens being configured to improve an optical characteristic of the second virtual image as seen by the human driver;

at least one first mirror positioned in the first optical path between the at least one picture generation unit and the first glare trap lens and configured to reflect the first light field; and at least one second mirror positioned in the second optical path between the at least one picture generation unit and the second glare trap lens and configured to reflect the second light field.

* * * * *